US006892752B2

(12) United States Patent
Burlock et al.

(10) Patent No.: US 6,892,752 B2
(45) Date of Patent: May 17, 2005

(54) PIPELINE ISOLATING DEVICE

(75) Inventors: Richard Burlock, Victoria (AU); Craig Evans, Victoria (AU)

(73) Assignees: Yarra Valley Water (AU); E D Evans Holdings PTY LTD (AU)

( * ) Notice: Subject to any disclaimer, the term of this patent is extended or adjusted under 35 U.S.C. 154(b) by 61 days.

(21) Appl. No.: 10/471,685

(22) PCT Filed: Mar. 13, 2002

(86) PCT No.: PCT/AU02/00281

§ 371 (c)(1),
(2), (4) Date: Feb. 2, 2004

(87) PCT Pub. No.: WO02/073080

PCT Pub. Date: Sep. 19, 2002

(65) Prior Publication Data

US 2004/0112431 A1 Jun. 17, 2004

(51) Int. Cl.$^7$ ..................... F16K 43/00; F16L 55/132
(52) U.S. Cl. ................ 137/317; 137/553; 138/89; 138/94; 138/97; 138/104; 251/58
(58) Field of Search ............... 137/553, 15.15, 137/317, 318; 138/104, 89, 93, 94, 97; 251/58, 62, 279

(56) References Cited

U.S. PATENT DOCUMENTS

| | | | | |
|---|---|---|---|---|
| 1,885,896 A | * | 11/1932 | Carr et al. ............... 138/94 |
| 2,476,907 A | * | 7/1949 | Preston et al. ........... 138/94 |
| 2,763,282 A | * | 9/1956 | Reedy et al. ............ 137/318 |
| 2,780,244 A | * | 2/1957 | Lee .......................... 138/94 |
| 2,899,983 A | * | 8/1959 | Farris ..................... 137/318 |
| 2,913,012 A | * | 11/1959 | McCurley ................ 138/94 |
| 2,964,290 A | * | 12/1960 | Mueller .................. 137/318 |
| 3,115,163 A | * | 12/1963 | Van Epps et al. ........ 138/94 |
| 3,120,246 A | * | 2/1964 | Alter ....................... 138/94 |
| 3,317,179 A | * | 5/1967 | Willis ...................... 251/58 |
| 4,299,255 A | * | 11/1981 | Miller ..................... 138/89 |
| 4,369,813 A | * | 1/1983 | Thomas .................. 138/94 |
| 4,570,900 A | * | 2/1986 | Lonardi et al. .......... 251/58 |
| 4,815,696 A | * | 3/1989 | Lonardi .................. 251/58 |
| 4,821,998 A | * | 4/1989 | Legille et al. ............ 251/58 |
| 5,186,199 A | * | 2/1993 | Murphy et al. .......... 138/97 |
| 5,443,095 A | * | 8/1995 | Glossop, Jr. ............. 138/94 |
| 5,542,643 A | * | 8/1996 | Breth ..................... 251/279 |
| 5,676,171 A | * | 10/1997 | Heed ..................... 137/318 |
| 5,690,139 A | * | 11/1997 | Murphy et al. ......... 137/317 |

* cited by examiner

*Primary Examiner*—John Rivell
(74) *Attorney, Agent, or Firm*—Fitch, Even, Tabin & Flannery

(57) ABSTRACT

A pipeline isolating device for istallation into and occlusion of a pressurised liquid or fluid supply pipe comprising a substantially solid and deformable boot (1) wich is adapted to move between an expanded and an unexpanded state and a shaped plunger (2) adapted to move into and out of said boot (1) wherein the boot (1) has a hollow interior (3) with a displacement contour (6) adapted to receive and cooperate with said plunger (2) so as to cause said boot (1) to move between said expanded state when the plunger (2) is inserted into said hollow interior (3) of the boot (1) and said unexpanded state when said plunger (2) is withdrawn from the interior (3) of the boot (1).

13 Claims, 6 Drawing Sheets

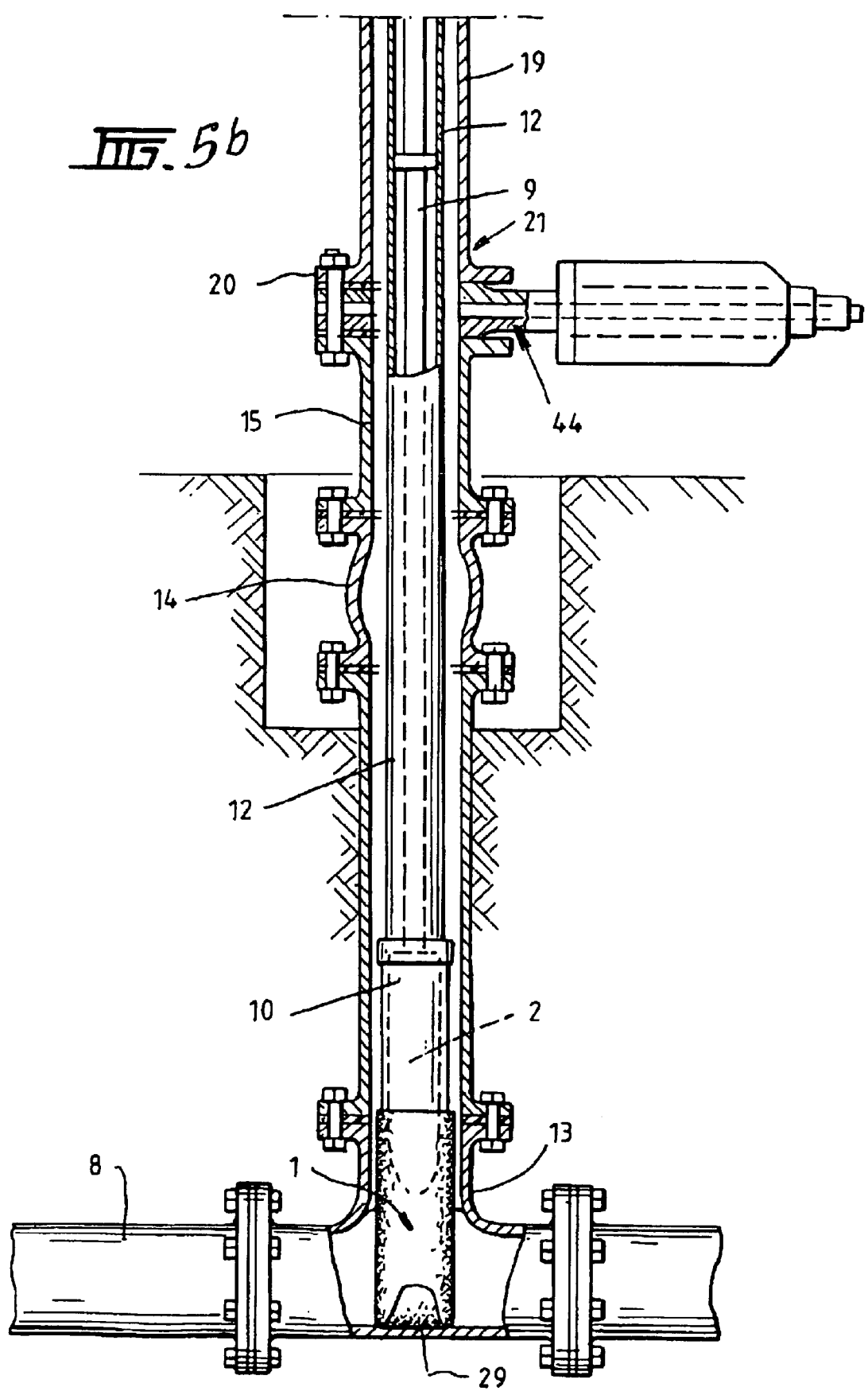

PIPELINE ISOLATING DEVICE

INTRODUCTION TO THE INVENTION

This invention relates to the maintenance of fluid or liquid carrying pipes and in particular to a device adapted for isolating a section of such piping to assist in maintenance work. In a particularly preferred aspect, the invention relates to the maintenance of water piping including town supply mains water piping.

BACKGROUND TO THE INVENTION

The commercial supply of fluids or liquids via piping, either to industry or the domestic population is generally involved in the supply of a commodity on which industry or the domestic market rely. Accordingly, the maintenance involved in such piping work can result in considerable disruption to the supply of the fluid or liquid commodity and it is highly desirable to expedite such maintenance operations, thereby minimising disruption and down-time to said piping supplies. A particular example of such piping systems is the town supply of mains water which provides potable water to households and light industry from reservoirs via pumps and a network of underground piping.

The piping is generally configured as a branching network of pipes that diminish in dimensions ending with the street mains water pipes of about 100 mm diameter running down and along suburban streets, past households and into which a plurality of individual households can tap.

At the street level, the mains water pipes are provided with closeable gates at regular intervals every kilometer or so, to allow sections of pipeline to be isolated so as to allow maintenance thereof. However, the number of gates provided only allows isolation of a relatively large area which may affect up to 50 or so households. Accordingly, in the situations where considerable maintenance is required, the disruption to such a large number of households can be considerable and may involve health issues.

The mains water piping whilst principally provided for the supply of household water, also functions for emergency water supplied by way of fire hydrants or fire plugs, many of which are fitted at regular intervals along the street front and allow emergency access to mains pressure water by fire fighters. Fire hydrants are generally installed at regular and frequent intervals along the mains water supply piping such that a plurality of fire hydrant access points exist between any two or more isolation gates in the mains water system. The fire hydrants are connected to a generally horizontal supply of piping with a short generally vertical riser forming a tee junction with the supplied piping. This riser is then usually joined to a suitable connecting means such as a male threaded pipe section via a gate valve or other type of control valve. It would be very desirable if such fire hydrant access points could be utilised to shut off the mains water supply by acting as a temporary isolation gates. This would be particularly advantageous as the frequency of hydrants would allow a relatively small number of households to be affected by mains water pipe maintenance if such hydrant points could be used to isolate a section of mains water piping. Unfortunately, the equipment available to date, does not generally allow the ready access and occlusion of a fluid or liquid piping at a given diameter, via an access point or aperture formed in said piping which is of less diameter than the diameter of the piping to be occluded. Furthermore, the available devices are either adapted for use with gaseous fluids only of limited pressure, are non reusable or unable to be used in conjunction with hydrant access points. The provision of such a device adapted for insertion into a mains water pipe against the normal water pressure, particularly if such a device could allow insertion through an aperture and subsequent occlusion of a pipe of two or more sizes greater than said aperture would be highly advantageous and would of course allow fire hydrants to be used as access points for mains water piping.

SUMMARY OF THE INVENTION

A pipeline isolating device adapted for installation into and occlusion of a pressurised liquid or fluid supply pipe comprising a substantially solid and deformable boot which is adapted to move between an expanded and an unexpanded state and a shaped plunger adapted to move into and out of said boot, wherein said boot has a hollow interior with a displacement contour adapted to receive and cooperate with said plunger so as to cause said boot to move between said expanded state when said plunger is inserted into said hollow interior of said boot and said unexpanded state when said plunger is withdrawn from the interior of said boot.

The displacement contour found on the interior of the boot is preferably configured so as to cause the exterior contour of the boot to mirror the internal shape of the supply pipe when the boot is in its expanded state.

In order to ensure the boot is not undesirably distorted or misshaped due to the presence of mains water pressure in the piping system, the boot is preferably provided with one or a plurality of guide rods which are adapted to retain the overall configuration of the boot whilst the hollow interior of the boot remains empty. The guide rods are also adapted to guide the axial movement of the plunger into an outer boot thereby assisting in maintaining the most desirable shape and configuration of the boot and allowing controlled cooperation with the plunger.

The plunger may be housed in a sleeve which can be fitted to the boot such that the movement of the plunger along the sleeve assists in the guidance of the plunger into and out of the boot. The plunger may be provided with an operating ram in the form of an extension rod so as to allow for remote activation of the plunger.

The sleeve into which the plunger is fitted may be provided with an extension tube for housing and guiding the operating ram and allowing for the remote control of the sleeve.

The pipeline isolating device of the invention may also be provided with a depth detection means in the form of a sensor for remotely identifying and relaying the position of the device during installation.

In another aspect the invention provides an installation and operating tool for use with the device of the invention as previously described. The installation and operating tool comprises a jig adapted for fitting to the liquid of fluid supply pipe, in particular, a fire hydrant outlet when the liquid supply pipe is a mains water supply. The jig may include a first and second clutch means with the first clutch means being fitted to the jig and adapted to engage the sleeve or extension tube of the device. A second clutch means is provided and is adapted to engage the sleeve or extension tube of the device wherein the second clutch is fitted to the jig and moveable in an axial direction relative to the first clutch means, such that the alternate engagement of the respective clutches and coordinated axial movement thereof provides for the installation and withdrawal of said device into or out of said liquid or fluid supply pipe.

The tool of the invention is particularly adapted for use on mains water plumbing and can be fitted to a fire hydrant or fire plug associated with such mains water system piping. The tool of the invention may include an elongate housing adapted fitting to the liquid or fluid supply pipe and is most preferably in the form of a housing adapted for fitting to the hydrant rise associated with the mains water pipe, wherein the housing coaxially accommodates the device which can be moved along the housing by coordinated action of the first and second clutches.

The tool of the invention must preferably include the means for activating the operating ram of the device so as to expand the plug when the plug has been located in an appropriate position, for example, the bottom of a t-joint of a mains water pipe. The activating means may take the form of a press adapted to activate the plunger of the device by moving the plunger into and out of the boot of the device.

The press may include a pair of folding extension arms pivoted at a first end in the region of said second clutch and the press may be provided with a pressing means at the second end thereof such that the press can be pivoted up to engage the top of the operating ram of the device, so as to press the ram into or draw the ram out of the device to operate said plunger.

The press is most preferably operated by way of a screw thread operated handle.

BRIEF DESCRIPTION OF THE DRAWINGS

FIG. 5b shows a front view in partial section of the lower part of installation and operating tool as fitted to a mains water pipe hydrant rise.

LEGEND

No.: Item

1 Boot
2 Plunger
3 Cavity
4 Plunger Body
5 Plunger Nose
6 Displacement Contour
7 Outside (boot)
8 Mains Water Pipe
9 Operating Ram
10 Sleeve
11 Screw Thread
12 Extension Tube
13 Tee Joint
14 Hydrant Housing
15 Hydrant Rise
16 Guide Rods
17 Apertures (plunger)
18 Position Sensor
19 Housing
20 Flange (housing)
21 First End (housing)
22 Second End (housing)
23 First Clutch Platform
24 Fixed Clutch
25 Second Clutch Platform
26 Active Clutch
27 Telescope Arms
28 Hydraulic Rams
29 Bottom of Tee Joint
30 Collar
31 Extension Arms
32 First End (Extension Arms)
33 Pivot
34 Second End (Extension Arms)
35 Press
36 Screw
34 Handle
38 "D" Arm
39 Ram
40 Cam
41 Pivot
42 Locking Ring
43 Guide Pin
44 Intermediate Gate
45 Seal

DETAILED DESCRIPTION OF THE INVENTION

The first aspect of the invention is concerned with an isolating device, particularly adapted for use on mains water piping installations. The isolating device of the invention is detailed in FIGS. 1 to 4, which show the device in its expanded and unexpanded state as installed in a mains water pipe via a fire hydrant access point.

Figure 1:
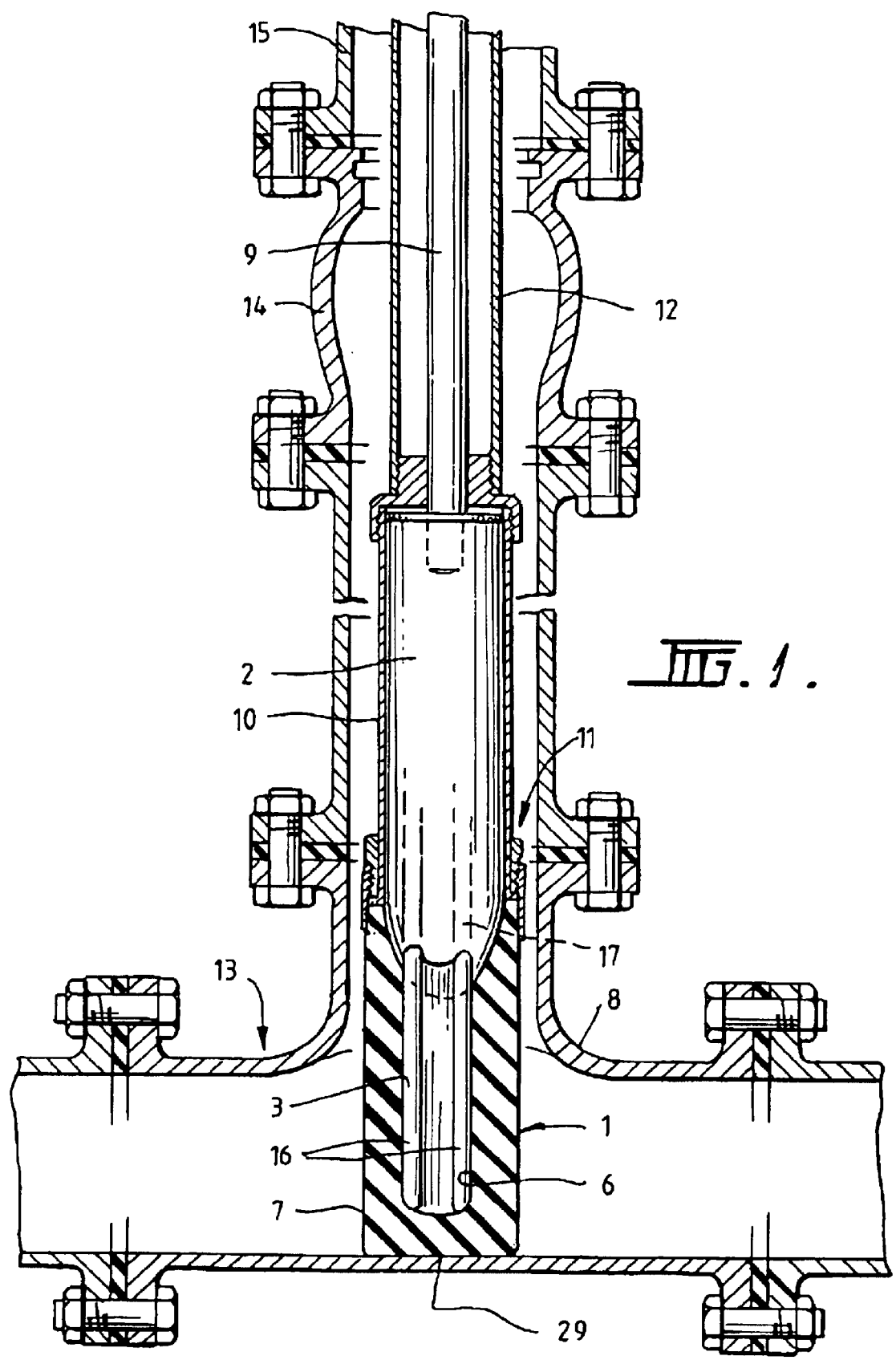
FIG. 1 shows a side view in cross section of the pipeline isolating device installed in a mains water pipe.
Figure 2:
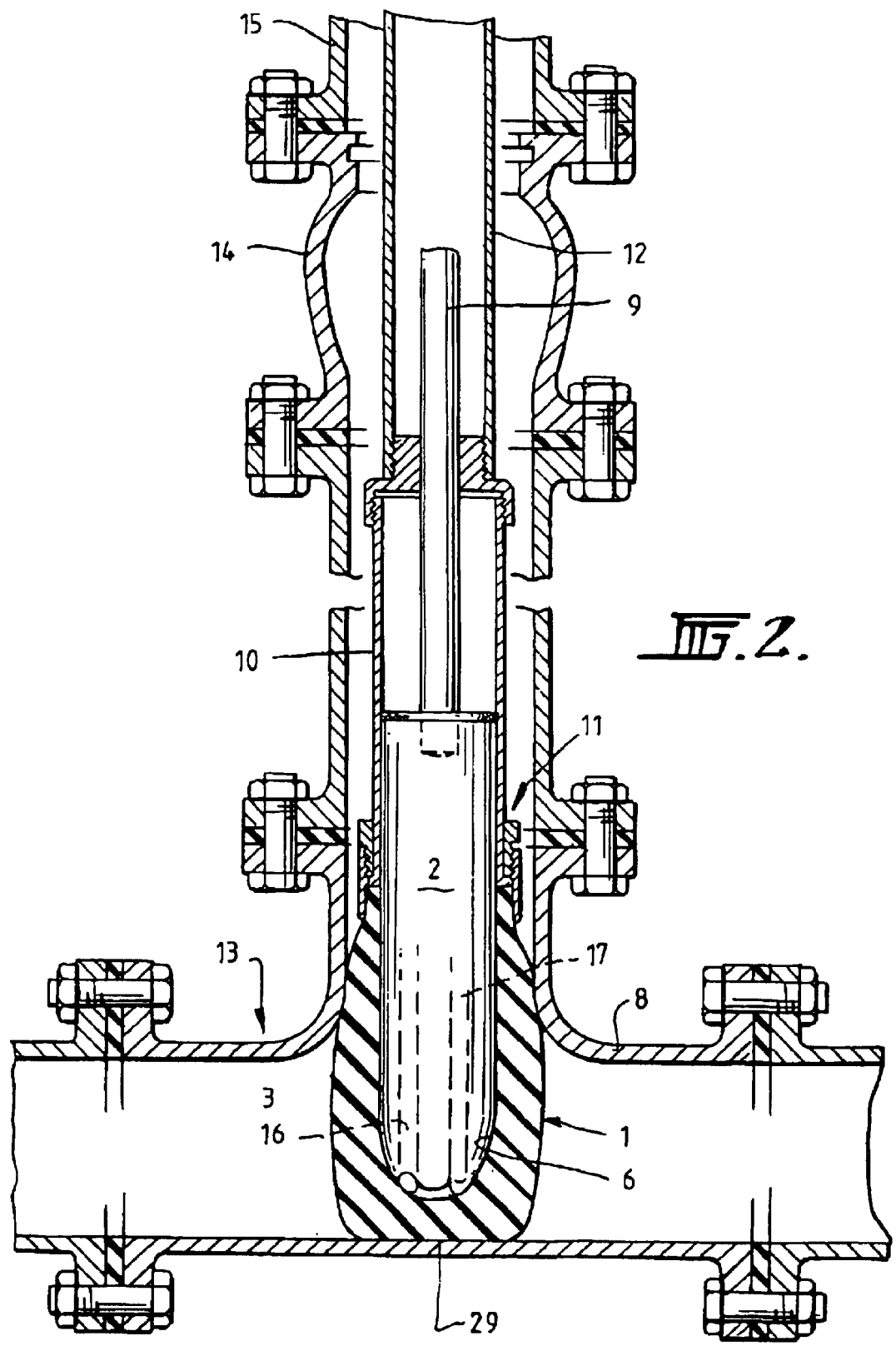
FIG. 2 shows a pipeline isolating device as activated to close off or occlude a mains water pipe.

Referring firstly to FIG. 1, the pipeline isolating device of the invention comprises a substantially solid, hollow and deformable boot 1 formed of compliant and suitably elastic material. The device is provided with a moveable plunger 2, which is adapted to move into and out of the internal cavity 3 of said boot. The plunger is provided with a body of substantially cylindrical shape 4 and a tapered nose region 5. The internal cavity 3 of the boot is shaped and configured to receive the plunger 2 such that the displacement contour 6 of the internal cavity of the boot is adapted to receive and cooperate with the plunger, such that when the plunger is urged into the cavity 3 of the boot 1, the boot is distorted and moved to its expanded state as shown in FIG. 2, such that the outside 7 of the boot is caused to expand and move out to fully occlude or close off the mains water pipe 8 into which it has been positioned.

The plunger is caused to move back and forth by way of an operating ram 9 which serves as an extension of the plunger thereby allowing operation of the device remotely and above ground from the subterranean position of the mains water pipe. The plunger 2 is provided with an outer sleeve 10 which is fitted to the boot 1 by way of a screw threaded region 11. In this manner, the sleeve 10 functions as an extension of the boot 1 and the axial movement of the plunger 2 in and out of the sleeve 10 allows the plunger to be inserted into and withdrawn from the boot 1. The sleeve 10 is provided with an extension tube 12 so as to allow remote operation of the device from above ground by way of the coordinated action of the extension tube 12 and the coaxially positioned operating ram 9. The extension tube and operating ram allows the device to be effectively extended beyond the mains pipe fire hydrant t-joint 13 which extends up into the hydrant housing 14 which is generally positioned just below ground level and hydrant rise 15 which is generally positioned at ground level.

Figure 3:
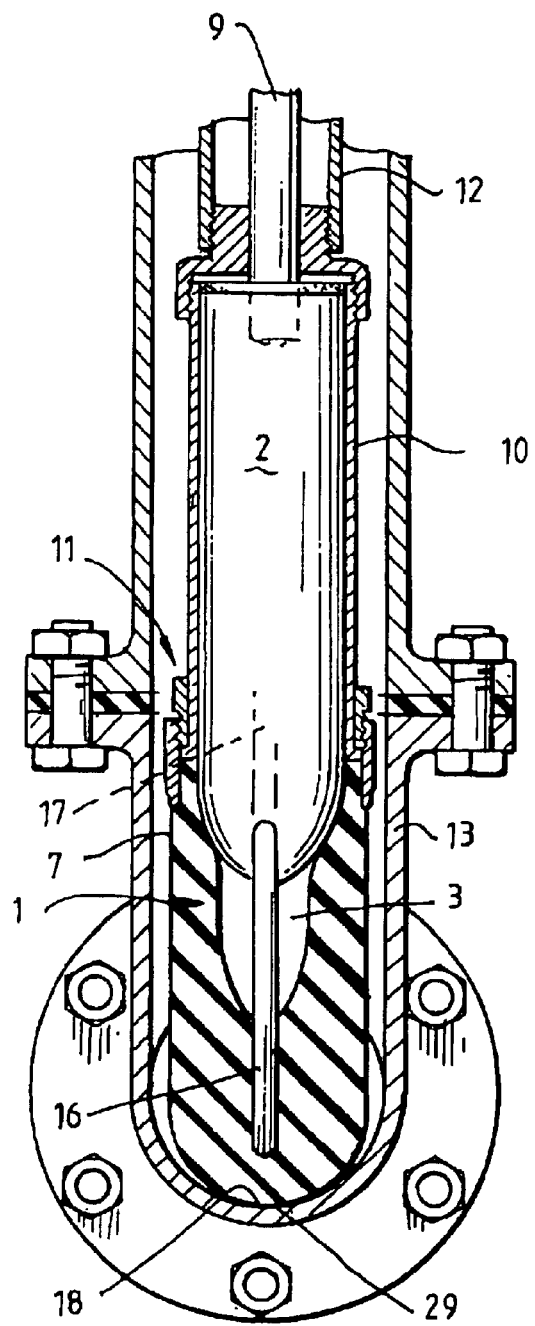
FIG. 3 shows an end view of the pipeline isolating device as installed in a mains water pipe in unexpanded state.
Figure 4:
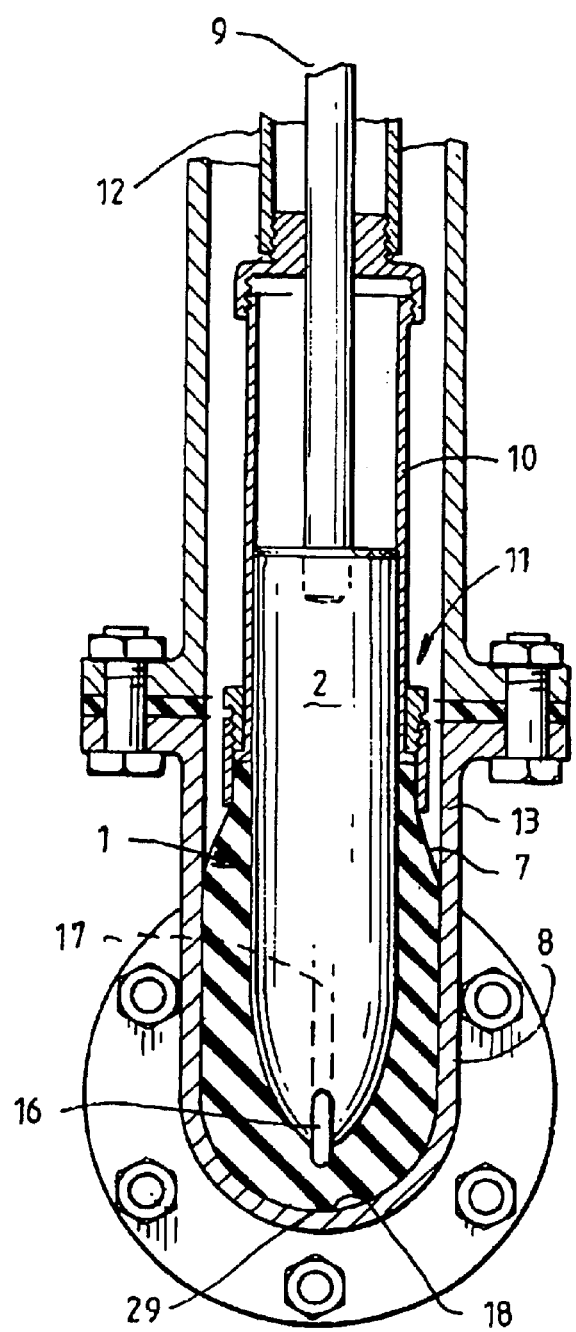
FIG. 4 shows an end view of the pipeline isolating device in expanded state to block off the mains water pipe.

The operation of the pipeline isolating device of the invention is particularly detailed in FIGS. 3 and 4. Referring firstly to FIG. 3, the device of the invention in its unexpanded state, is sufficiently compact to allow insertion through the hydrant rise, hydrant housing and t-joint of a mains water pipe system with the unexpanded outside contour 7 and dimensions of the boot 1, allowing ready insertion down to the bottom 16 of the t-joint 13.

In order to ensure that the boot of the device is not distorted as it is subjected to mains water pressure during installation, particularly as the boot is inserted down the hydrant rise and approaches the mains water pipe where it is subject to particular turbulence and sideward pressure of water movement along the mains water pipe, the compliant boot 1 is provided with twin guide rods 16 which are formed internally within the boot's structure and provide suitable rigidity to the boot so as to resist any deflection from water pressure encountered in the environment of the mains water piping. The guide rods 16 are adapted to cooperate with elongate apertures 17 formed within the plunger such that the plunger can move into and out of the internal cavity 3 of the boot 1 under the guidance and direction of the rigid guide rods 16. The isolating device of the invention is provided with a position detecting means 18, in the form of a sensor positioned at or near the lower end of the boot 1 such that the remote positioning of the pipeline isolating device can be fully controlled by remote activation and the positioning of the boot can be carefully controlled such that once the boot abuts the bottom 29 of the t-joint 13, it can be caused to snugly engage the bottom thereof and be locked in that position. Once locked in that position, the plunger can be caused to move into the cavity of the boot 1, thereby causing the cavity to expand and fully occlude both the mains water pipe region 8 and the t-joint 13 of the hydrant environment so as to completely isolate either side of the mains pipe and the hydrant region of the pipe.

Referring now to FIG. 4, the device of the invention is shown in its expanded state where the plunger 2, once suitably positioned at the bottom 29 of the t-joint can then have the plunger activated by displacing the operating ram 9 down the extension tube 12, so as to cause the plunger 2 to be inserted into the internal cavity 3 of the boot 1. The insertion of the plunger into the boot 1, causes the outside contour of the boot to expand out to block off both the mains water pipe 8 and the t-joint 13.

In order to efficiently install and operate the pipeline isolating device of the invention, an installation and operating tool for the device as previously described is provided as a further aspect of the current invention.

Figure 5A:
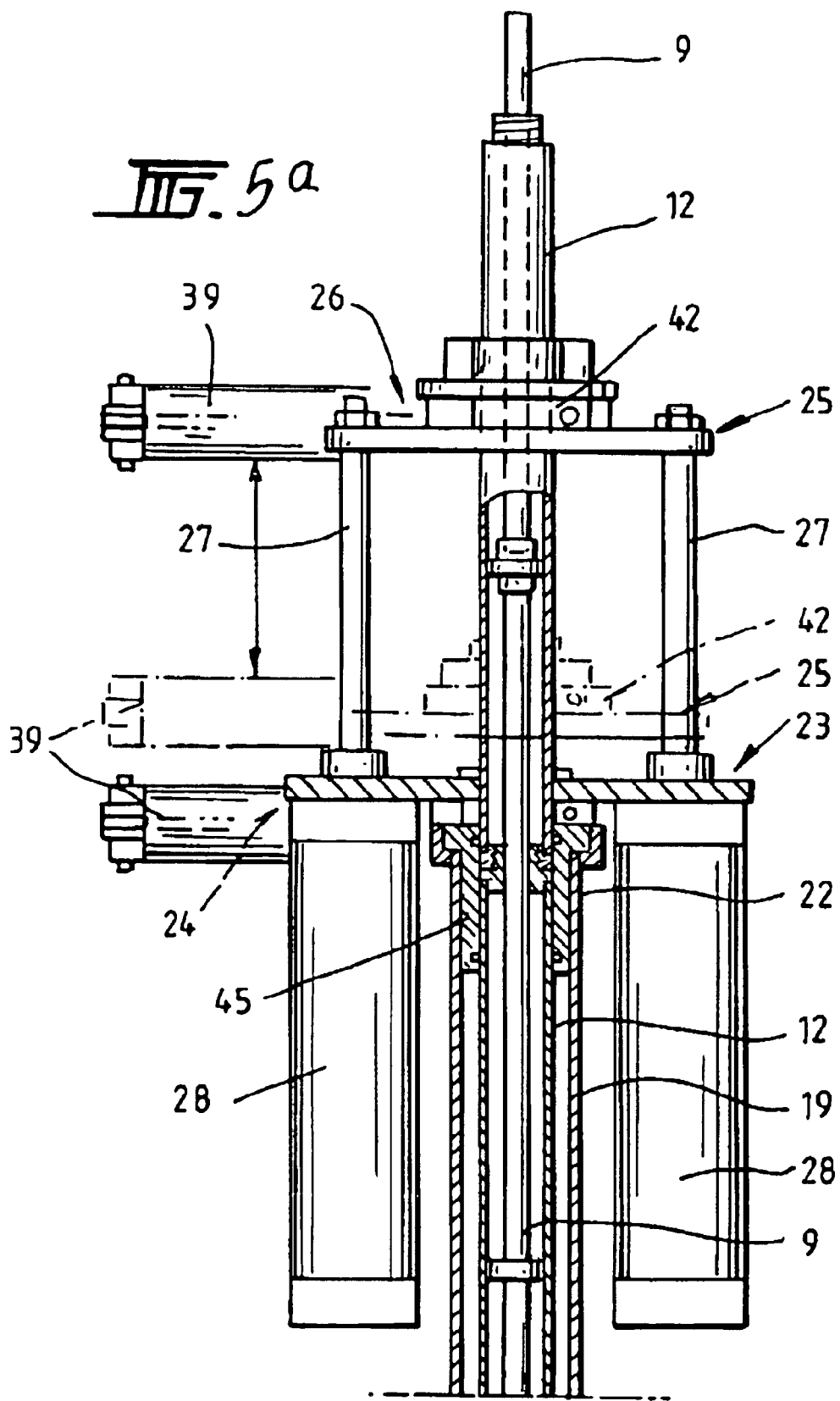
FIG. 5a shows a front view in partial section of the upper part of an installation and operating tool for use with the device of the invention.

Referring firstly to FIGS. 5a and 5b, the upper and lower part of the installation and operating tool is shown as fitted to the hydrant rise 15 associated with a mains water pipe 8.

One of the key advantages of the pipeline isolating device of the invention is the ability of the invention to be installed in conveniently located hydrant sites along the length of a mains water pipe. However, in order to maximise the convenience of such access points, its highly desirable that the pipeline isolating device of the invention can be installed in such fire hydrant points without closing down the mains water supply to the hydrant in question. Accordingly, the isolating device of the invention is adapted for installation through a fire hydrant system against the back pressure of mains water within such a system and the dedicated installation and operating tool forming a further aspect of the invention is particularly adapted to assist in this task.

Referring simultaneously to FIGS. 5a and 5b, the tool takes the form of a jig arrangement having an elongate housing 19, terminating in a flange 20, particularly adapted to mate and fit to the exposed flange of the hydrant rise 15. The flange 20 is positioned at a first end 21 of the housing 19. The second end 22 of the housing 19 is provided with a first clutch platform 23 which serves to mount a fixed clutch 24 which is adapted to engage or disengage the sleeve 10 or extension tube 12 of a pipeline isolating device of the invention which has been fitted to the tool. In this manner, the fixed clutch 24 is able to arrest the axial movement of the extension tube, sleeve and ultimately the terminal boot 1 of the device of the invention.

In order to control the vertical movement of the device up and down the fire hydrant, the tool is provided with a second clutch platform 25 to which is fitted an active clutch 26. The active clutch 26 is adapted to engage and disengage the extension tube 12 or sleeve 10 in an analogous manner to that of the fixed clutch 24 further up the length of the tube or sleeve. In order to facilitate movement of the device along the length of the hydrant relative to the hydrant, the second clutch platform 25 is moveable axially relative to the first clutch platform 23 and connected thereto by telescopic arms 27. The telescopic arms are operated by hydraulic rams fitted to the first hydraulic rams 28, fitted to the first clutch platform 23. In this manner, the coordinated and alternate operation of the fixed and active clutches and the axial movement of the telescopic arms, allows the device of the invention to be progressively fed down the hydrant housing until the boot 1 is caused to snugly abut the bottom 29 of the mains pipe t-joint 13.

Once the pipeline isolating device of the invention has been suitably installed through a fire hydrant into the mains pipe system, it is then necessary to cause the plunger 2 to be drawn down into the cavity of the boot so as to cause the boot to move from its unexpanded to its expanded state and thereby occlude or block off the mains pipe.

Figure 6:
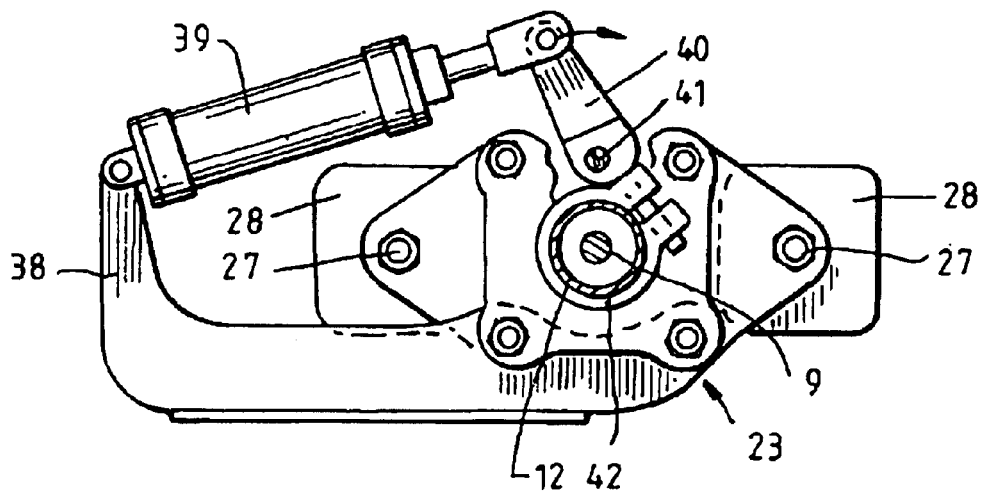
FIG. 6 shows the clutch detail of the installation and operating tool in plan view.

Referring now to FIG. 6, the details of the operation of the first and second clutches is shown by way of the mechanism detailed in plan view in this figure. Both active and fixed clutches operate with an identical mechanism and reference will be made to the fixed clutch only. The clutch comprises a clutch platform 23 which is mounted to the second end 22 of the housing 19 (not shown). The clutch platform therefor forms a point of reference with the housing and is fitted with an outrigger "D" arm 38. The arm is provided with an hydraulic ram 39 which operates a cam 40 pivoted at 41. The clutch platform is further provided with a compliant locking ring 42 which surrounds the sleeve or extension tube 12 and the selective operation of the cam 40 causes the locking ring to clamp around the extension tube 12 and thereby lock the axial movement of the extension tube relative to the clutch platform, or alternatively, the reverse movement of the cam 40 serves to open the locking ring and disengage the clutch.

Figure 7:
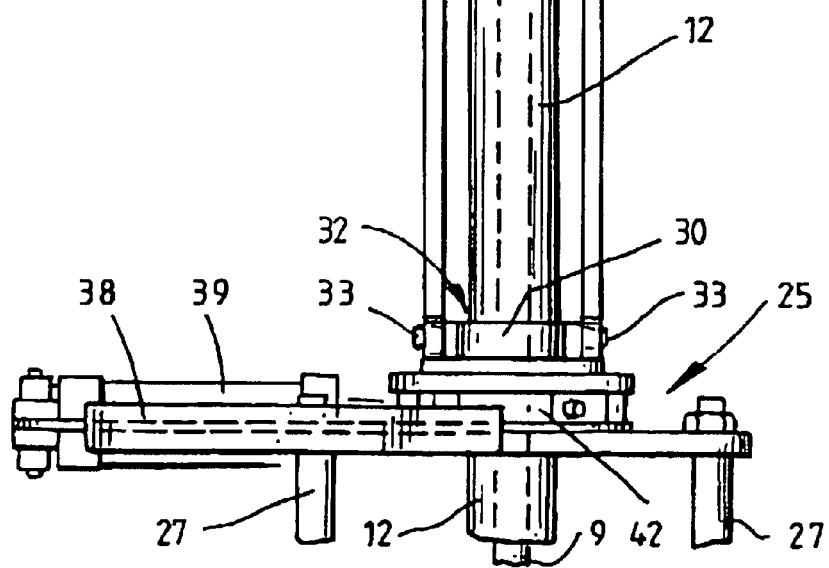
FIG. 7 shows a front view of the installation and operating tool press.

The operating of the plunger is accomplished by way of a press means detailed in FIG. 7. The press means is associated with the second clutch platform 25 by way of a collar 30 which is provided with dual extension arms 31, pivoted at a first end 32 by pivots 33. The second end 34 of the extension arms is provided with a press head 35 and a threaded screw 36 having a rotatable handle 37 fitted thereto. The press means is adapted to be fitted to the tool and swung up into operation once the pipeline isolating device of the invention is suitably located by the tool. The press means is rotated about the pivot points 33 and drawn up such that the handle 37 is aligned with the exposed end of the operating ram 9. Once the press is in place and connected to the ram, rotation of a handle 37 will cause the operating ram to move in or out of sleeve or extension tube 12 thereby causing the plunger 2 (not shown) to move into or out of the cavity of the boot 1 thereby causing the boot 1 to move between the expanded and unexpanded state.

In use, the pipeline isolating device of the invention would be used where a short interval of mains water piping or similar supply system required isolation for maintenance or overhaul. In the case of mains water piping, that section of pipeline identified would be closed off via fire hydrant access points either side thereof. The fire hydrants would be identified and in the case of fire hydrant fitted with auto shut-off valving, the fire hydrants would be removed and a suitable gating tool installed on the exposed hydrant rises would be put in place so as to facilitate closing off of the mains water pressure once the hydrant valves have been removed. The removal of the hydrant valves is described in co-pending Australian patent application 199893225, the disclosures of which are incorporated here by reference. Referring principally to FIGS. 5a and 5b, once the spring hydrant valve is removed, the temporary or intermediate gate 44 can be closed off to retain mains water pressure and the installation and operating tool of the invention would be fitted to the intermediate gate 44 as shown in FIG. 5b. Once the installation tool is fitted by bolting the mating flange 20 to the hydrant rise via the intermediate gate, the pipeline isolating device of the invention would be fed down through the active and fixed clutch locking rings, into the elongate housing 19 via the top seal 45. Once the pipeline isolating device of the invention is progressed down the length of the housing to the region of the intermediate gate 44, the intermediate gate can then be opened, exposing the inside of the housing 19 to the mains water pressure present along the length of the hydrant and the mains water pipe 8. Water is prevented from escaping the housing by the seal 45 and at this stage, any further insertion of the device of the invention must be made against faucet mains water pressure within the housing 19 and the hydrant housing. In order to progress the insertion of the device and prevent the device as so far installed being pushed back out of the tool, the fixed clutch 24 is engaged to ensure that the extension tube 12 is locked against any axial movement out of the housing 19. The next step involves engaging the active clutch 26 which has been moved to a remote position by the extension of the telescopic arms 27. Once the active clutch is engaged at a position further up the extension tube 12, the fixed clutch 24 could be disengaged and the drawing in of the telescopic arms 27 thereby causes the progressive insertion of the extension tube and device of the invention down the length of the housing 19. The insertion of the device will generally require multiple steps as the reach of the telescopic arms will be limited. Once the telescopic arms have been fully retracted, the fixed clutch 24 is again engaged whence the active clutch can then be disengaged, ensuring that the device of the invention does not move back against the mains water pressure. The telescopic arms can then move back out lifting up the clutch platform 25 and active clutch 26 to a new position further up the length of the extension tube 12. At this stage, the active clutch again engages the next position on the extension tube 12 and with the release of the fixed clutch and retraction of the telescopic arms, the extension tube 12 and device of the invention is further progressed down the hydrant housing. The device of the invention is progressed in the stepwise fashion in the above described manner until the boot 1 reaches the bottom of the t-joint 29. At this point, the position detecting means or sensor 18 communicates the position of the boot to the operator and further insertion of the device is stopped. At that point, with the boot snugly bearing against the bottom of the t-joint, the position of the device of the invention can be fixed and activation of the plunger commenced. The plunger is caused to move down the length of the device by way of the operating ram 9 which projects out beyond the top end of the extension tube 12. The operating ram is accessible by way of the press means as previously described which is fitted to the active clutch as detailed in FIG. 7. At this stage, the handle 37 can be wound down to progressively draw the plunger 2 down into the cavity 3 of the boot 1 thereby causing the boot to move from its unexpanded to its expanded state and thereby occluding the mains water pipe 8 and hydrant region of the pipe. This action thereby serves to occlude or block off the mains water pipe at the respective hydrant points thereby isolating that section of mains pipe with a minimal disruption and in minimal time. The action of the various hydraulic rams and movements of the clutches can all be coordinated and computer controlled to minimise operational errors and the jig of the invention can be provided with necessary hydraulic hosings and fittings to allow minimal operational skills to accomplish the most efficient operation.

In use, the invention finds application in virtually any situation where a fluid or liquid carrying pipe requires interception and isolation; particularly where an aperture smaller than the diameter of the main pipe is available. In the case of a mains water maintenance situation, the area of mains water piping requiring maintenance would be identified and sections either side provided with fire hydrants would be closed off and the isolating device of the invention would be installed down the fire hydrant.

The advantages of the invention are numerous, particularly including the ability to readily access piping through an aperture available therein or one formed two or more sizes down from the diameter of pipe requiring maintenance. This provision alone allows for a great increase in maintenance efficiency but most importantly allows the invention to be used in situations where ready access points are available, for example, fire hydrant access to mains water systems. The invention also provides a means of closing off any size piping where a cut-out from that piping is limited. In applications where more than two sizing are required to be traversed, the invention can provide modifications where, for example, the expanding arms include multiple complementary elements where the arms can be made up of a series of concertinaed units allowing great expansion over many sizes.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. A pipeline isolating device adapted for installation into and occlusion of a pressurised liquid or fluid supply pipe comprising a substantially solid and deformable boot which is adapted to move between an expanded and an unexpanded state and a shaped plunger adapted to move into and out of said boot, wherein said boot has a hollow interior with a displacement contour adapted to receive and cooperate with said plunger so as to cause said boot to move between said expanded state when said plunger is inserted into said hollow interior of said boot and said unexpanded state when said plunger is withdrawn from the interior of said boot, wherein said boot is provided with at least one guide rod adapted to guide the axial movement of said plunger into and out of said boot and to minimize any deflection of said boot under said pressure.

2. A pipeline isolating device according to claim 1 wherein the displacement contour of the interior of said boot is configured to cause the exterior contour of said boot to substantially mirror the internal shape of said supply pipe when in said expanded state.

3. A pipeline isolating device according to claim 1 wherein said plunger is housed in a sleeve fitted to said boot such that the movement of said plunger along said sleeve guides the plunger into and out of said boot.

4. A pipeline isolating device according to claim 3 wherein said plunger has an operating ram fitted thereto for remote activation of plunger.

5. A pipeline isolating device according to claim 4 wherein said sleeve is provided with an extension tube for housing and guiding said operating ram.

6. A pipeline isolating device according to claim 1, including a depth detection means for remotely identifying the position of said device within said pipeline.

7. An installation and operating tool for a pipeline isolating device adapted for installation into and occlusion of a pressurized liquid or fluid supply pipe comprising a substantially solid and deformable boot which is adapted to move between an expanded and an unexpanded state and a shaped plunger adapted to move into and out of said boot, wherein said boot has a hollow interior with a displacement contour adapted to receive and cooperate with said plunger so as to cause said boot to move between said expanded state when said plunger is inserted into said hollow interior of said boot and said unexpanded state when said plunger is withdrawn from the interior of said boot, said installation and operating tool comprising a jig adapted for fitting to said liquid or fluid supply pipe, said jig including a first and a second clutch means, said first clutch means being fitted to said jig and adapted to engage a sleeve or extension tube of said device and a second clutch means adapted to engage the sleeve or extension tube of said device, wherein said second clutch is fitted to said jig and moveable in an axial direction relative to said first clutch means such that the alternate engagement of the respective clutches and coordinated axial movement thereof provides for the installation or withdrawal of said device into or out of said liquid or fluid supply pipe.

8. A tool according to claim 7 adapted for fitting to a hydrant rise of a fire hydrant or file plug associated with a mains water supply pipe, said jig including a first and a second clutch means, said first clutch means being fitted to said jig and adapted to engage the sleeve or extension tube of said device and said second clutch means adapted to engage the sleeve or extension tube said device wherein said second clutch is fitted to said jig and moveable in an axial direction relative to said first clutch means such that the alternate engagement of the respective clutches and coordinated axial movement thereof provides for the installation or withdrawal of said device through said hydrant rise against the mains water pressure in said hydrant rise.

9. A tool according to claim 8 including an elongate housing adapted for fitting to said hydrant rise wherein said housing coaxially accommodates said device which can be moved along said housing by the coordinated action of said first and second clutches.

10. A tool according to claim 8 further including a means for activating an operating ram of said device so as to expand said plug at an appropriate position.

11. A tool according to claim 10 wherein said activating means includes a press adapted to activate the plunger of said device by moving said plunger into and/or out of the boot of said device.

12. A tool according to claim 11 wherein said press includes a pair of folding extension arms pivoted at a first end at the region of said second clutch and provided with a pressing means at a second end thereof such that said press can be pivoted with a pressing means at a second end thereof such that said press can be pivoted up to engage the top of the operating ram of said device so as to press said ram into or draw said ram out of said device to operate said plunger.

13. A tool according to claim 12 wherein said pressing means include a screw thread operated handle.

* * * * *